United States Patent Office 3,576,899
Patented Apr. 27, 1971

3,576,899
METHOD FOR MANUFACTURING HIGH PURITY METHANE
Tadashi Ishiguro, Tokyo, Akira Tomita, Kawasaki-shi, Shohachi Egashira, Sagamihara-shi, Tetsuji Nakamura, Atsugi-shi, and Hiroo Matsuoka, Yokohama-shi, Japan, assignors to Japan Gasoline Co., Ltd., Tokyo, Japan
No Drawing. Filed Apr. 18, 1968, Ser. No. 722,199
Claims priority, application Japan, Apr. 27, 1967, 42/27,098
Int. Cl. C07c 9/04; C10g 13/02, 13/30
U.S. Cl. 260—676                                          5 Claims

ABSTRACT OF THE DISCLOSURE

In the manufacture of methane from a hydrocarbon having two or more carbon atoms per molecule by hydrocracking the same, i.e. by passing the hydrocarbon jointly with hydrogen through a bed of highly activated solid nickel catalyst, a high purity methane will be obtained if the maximum temperature of said catalyst bed is held within the range from 400° C. to 600° C. by supplying steam to said bed and if the temperature at the outlet of said bed is maintained 100° C. lower than said maximum temperature by removing reaction heat from the catalyst bed by means of indirect heat exchange.

BACKGROUND OF THE INVENTION (a) Field of the invention

The present invention relates to a method for converting a hydrocarbon having at least two carbon atoms per molecule to high purity methane.

(b) Description of the prior art

In the chemical industries designed to synthesize such substances as cyanic acid, carbon disulfide and chloroform, it has been the general practice to employ methane as the starting material. Viewing from such factors as the transportation of methane as the raw material and the manner and the extent in which natural gases are being utilized, it would be more desirable to make use of petroleum fractions such as liquefied petroleum gas or naphtha rather than using natural methane or natural gases. In view of the fact, however, that no perfect techniques of manufacturing chemical products, by synthesis, from these petroleum fractions as the starting material have been accomplished as yet, it is presently not feasible to utilize such raw material as these petroleum fractions as substitutes for methane or natural gas.

On the other hand, however, methane is quite desirable for use as a gaseous fuel having a high caloric value, and besides, methane can be utilized widely for various industrial purposes. It is for these reasons that the development of a method for economic production of methane has long been sought.

In order to obtain methane from a relatively higher hydrocarbon having at least two carbon atoms per molecule, it is most appropriate to attain this purpose by means of a hydrocracking process. It is to be noted, however, that such hydrocracking reaction is a tremendously high exothermic one as will be noted from the following examples:

$C_2H_6 + H_2 = 2CH_4 + 15.5$ Kcal./mole
$C_3H_8 + 2H_2 = 3CH_4 + 28.8$ Kcal./mole
$n\text{-}C_4H_{10} + 3H_2 = 4CH_4 + 41.4$ Kcal./mole
$n\text{-}C_5H_{12} + 4H_2 = 5CH_4 + 54.4$ Kcal./mole
$n\text{-}C_6H_{14} + 5H_2 = 6CH_4 + 67.4$ Kcal./mole
$n\text{-}C_7H_{16} + 6H_2 = 7CH_4 + 80.3$ Kcal./mole For example, where 1 mole of normal hexane and 5 moles of hydrogen are subjected to hydrocracking in a reactor under the condition that the temperature at the inlet is about 200° C., the temperature at the outlet of the catalyst bed will reach a level as high as about 970° C. When the temperature of the catalyst bed reaches such a highly elevated level, there not only occurs a deterioration of the hydrocracking activity of the catalyst used, but also there will appear deposition of carbonaceous substances on the surfaces of the catalyst owing to the decomposition of the hydrocarbon which is fed into the catalyst bed. For this reason, in carrying out a hydrocracking of hydrocarbons, specific and careful measures must be taken to remove the generated reaction heat from the bed. As the reactor for use in the hydrocracking process and designed particularly for permitting the removal of the reaction heat, there have been proposed, for example, an externally cooled multi-tube reactor and a multi-stage type reactor equipped with cooling means. Neither of these reactors of the prior art, however, has proved to be capable of giving a satisfactory result. The reason for this failure experienced in these reactors of the prior art is considered to lie in the following fact. As has been stated above, hydrocracking of hydrocarbons is a reaction which is accompanied by the generation of tremendous heat within the reactor. Therefore, once a reaction has been started, the reaction will progress with accelerated velocity. Even where the external cooling is effectively carried out, it will be practically impossible to avoid local overheating of the catalyst bed. The employment of a multi-stage type reactor, on the other hand, is inconvenient and has the disadvantage that there will be required the provision of an extremely great number of reaction stages in the reactor if it is to perform effective removal of the reaction heat, and further that the use of a large number of reaction stages will inevitably lead to considerable difficulty in the control of the temperature of the catalyst bed.

As will be understood from the foregoing statement, the manufacture of methane by using the process of hydrocracking higher hydrocarbons involves a great deal of difficulty from the practical point of view. Even when the purpose of removing the reaction heat from the catalyst bed is attained to a certain extent, it would still be practically impossible to preserve the activity of the catalyst used without incurring the deposition of carbonaceous substances on the surfaces of the catalyst particles impossible to thereby sustain a desirable and satisfactory reaction for an extended period of time. For the foregoing reasons, there has been encountered no instance heretofore where a reaction which is performed by utilizing a reactor of the prior type has resulted in a real success industrially, notwithstanding the fact that such a reaction conducted by the use of such a reactor is considered theoretically possible. Furthermore, in the process of hydrocracking hydrocarbons, there has always been a need, in general, to use hydrogen in such an excessively large amount as at least several times the theoretical amount in order to inhibit the deposition of carbonaceous substances. As a result, the methane produced will be inevitably diluted by the hydrogen which is supplied in such an excessively large amount, even when it is taken for granted that the hydrocracking of hydrocarbon is conducted at a yield of product as high as 100 percent. Such an operation, accordingly, requires the inclusion of an additional process of separating and concentrating the gas produced. The separation of methane from hydrogen requires complicated apparatuses and troublesome operations, and this will naturally affect greatly the manufacturing cost of methane.

The hydrocracking methods of the prior art which have been described above are those so designed as to obtain methane directly from hydrocarbons having two or more carbon atoms per molecule. Apart from these methods, it is also possible to manufacture methane in a roundabout fashion by appropriately combining a series of steps. The combination of the three steps, i.e. steam-reforming of hydrocarbon, methanation and removal of carbon dioxide is a typical example of such roundabout methods of the prior art. This latter method, however, contains serious disadvantages in that the process is complicated by the numerous treating steps and also that the yield of methane is theoretically low. Accordingly, this method cannot be termed an economical one either.

SUMMARY OF THE INVENTION

It is, therefore, the object of the present invention to economically manufacture a high purity methane from higher hydrocarbons by allowing the hydrocracking reaction to proceed efficiently and with stability continuously for an extended period of time under novel and desirable conditions of reaction without causing the deposition of carbonaceous substances while at the same time preventing an unusual elevation of the reaction temperature from taking place by novel means of controlling the tremendous generation of heat within the catalyst bed which inevitably occurs therein when hydrocarbons are subjected to hydrocracking.

The present invention provides a method for manufacturing a high purity methane which is conducted by carrying out hydrocracking of a higher hydrocarbon having two or more carbon atoms per molecule, said method being characterized by the fact that, in the production of methane which is performed by bringing a raw feed consisting of a hydrocarbon—which may be a petroleum fraction such as liquefied petroleum gas, naphtha, kerosene and light oil, or it may be other kind of hydrocarbon—together with hydrogen, which is fed in an amount ranging from 90% to 150% of the amount theoretically required for the production of methane by means of the hydrocracking of such a raw feed, into contact with a highly activated solid nickel catalyst, there is supplied steam to the catalyst bed while being mixed with said raw feed, in an amount sufficient to maintain the maximum temperature of the catalyst bed to a level ranging from 400° C. to 600° C., and also there is removed the reaction heat from the catalyst bed indirectly through heat exchange in such a way that the temperature at the outlet of the catalyst bed is maintained always at least 100° C. lower than the aforesaid maximum temperature of the catalyst bed. The present invention contemplates the attainment of the aforesaid object by the adoption of the abovestated method. It is surprising that according to the present invention the otherwise inevitable elevation of the reaction temperature which occurs when hydrocarbons are subjected to hydrocracking can be controlled within the limits described by the use of a relatively small amount of steam supplied to the reaction zone. This is literally a very unexpectedly novel and significant effect and advantage. It can be said, therefore, that the manufacture, on an industrial basis, of methane which is conducted by using hydrocracking techniques is for the first time made possible by the present invention.

One of the important features of the present invention lies in the principle that hydrogen gas is fed to the reaction zone in chemical equivalents. This supply of hydrogen gas to the reaction zone permits the conversion, by hydrocracking, of the raw feed to methane to be accomplished with perfection. The amount of hydrogen to be supplied to the reaction zone can vary depending on the properties (such as the mean molecular weight, the degree of unsaturation, the composition and the impurities contained) of the hydrocarbon which is fed as the raw feed. For example, in case an oil fraction such as light oil or an unsaturated oil fraction such as thermally cracked oil and tar light oil is treated, there will be accordingly required a greater amount of hydrogen. Furthermore, in case the hydrogen gas which is fed to the reaction zone contains impurities such as carbon oxides, ethane and propane, these impurities will also be converted to methane by being hydrocracked. Therefore, the hydrogen supply which is required for the hydrocracking of these impurities will have to be included in the theoretically required amount of hydrogen. In practice, however, it is difficult to feed a theoretically calculated precise amount of hydrogen for each operation. In the present invention, there is supplied hydrogen in an amount which is in the range of from 90% to 150% of the theoretically estimated amount. No perfect hydrocracking reaction will be carried out where the supply of hydrogen is smaller than the theoretically necessary amount, and therefore, it is necessary to supply hydrogen in an amount at least the minimum of 90% of the theoretical amount. It has been noted that the supply of hydrogen in an amount of this order gives hardly any adverse effect on either the reaction, per se, or the concentration of the methane produced. On the other hand, it has been the practice in general to supply hydrogen in an excessive amount in the process of hydrocracking. According to the present invention, however, there is obtained a satisfactory result from the supply of hydrogen in just the theoretical amount where the raw feed which is subjected to hydrocracking consists of an ordinary fraction obtained from the distillates of straight run petroleum. Even in case the raw feed hydrocarbon is of a kind that is difficult to treat, i.e. to be hydrocracked, the method of the present invention will successfully avoid the occurrence of the deposition of carbonaceous substances and will give very little adverse effect on the degree of concentration of the methane produced, by dint of the supply of said excess hydrogen in only a much reduced amount than is required in the conventional methods. Although the upper limit of the amount of the hydrogen supply is set at 150% of the theoretical amount, it is to be noted that, even when there is present in the reaction zone a surplus hydrogen in excess of this limit, such surplus hydrogen will only pass through the reaction zone without undergoing a reaction.

As the hydrogen gas which is applicable to the method of the present invention, there can be employed various hydrogen-bearing gases which are produced industrially. In case, however, the raw feed contains impurities such as oxides, ethane and propane, these impurities will naturally consume part of the hydrogen supplied. Therefore, in such instances where the raw feed contains impurities, it is desirable to use a hydrogen-bearing gas which contains hydrogen in an amount of the order of 70%.

The most important feature of the present invention lies in one phase of the manner in which the hydrocracking reaction is carried out, i.e. the fact that the hydrocracking reaction is conducted by maintaining the maximum temperature of the catalyst bed at a level ranging from 400° C. to 600° C. owing to the supply of an appropriate amount of steam to the reactor. The steam is supplied in a relatively small amount, i.e. usually in the range of from 0.5 kg. to 3.5 kg. per kg. of the raw feed hydrocarbon. It is indeed surprising that the reaction temperature can be controlled as described and also that the deposition of carbonaceous substances can be arrested by the supply of steam in such small amount.

Another important feature of the present invention is found in the fact that, in addition to the aforesaid control of the reaction temperature by the supply of steam, part of the reaction heat is removed by indirect heat exchange. The cooling means which consists of indirect heat exchange and which is applied to the present invention requires no provision of complicated special apparatus since the quantity of heat which is to be removed is small. This cooling may be performed by an intermediate cooling system (including the cooling which is effected by coils provided within the reactor and the cooling which is performed by a heat exchanger which is provided outside the reactor), or it may be in the form of interconnected cooling system (including the multi-tube cooling system and the jacket cooling system), or any other appropriate cooling system may be employed. In carrying out this cooling, the reacting fluid may be cooled to a level of the order of the ambient temperature in the intermediate cooling stage in order to condense and separate the moisture therefrom, and the resulting fluid may again be brought into the reaction zone to resume reaction. Thus, the temperature at the outlet of the reaction zone is maintained at a level which is at least 100° C. lower than the maximum temperature of the catalyst bed, the outlet temperature being usually maintained at a level which is 100° C. to 300° C. lower than the maximum temperature. By controlling the temperature condition in the manner as described above, not only are solved many problems such, as for example, as the deterioration of the activity of the catalyst due to the very high temperature of reaction to which the catalyst is exposed, and the arresting of the deposition of carbonaceous substances or the difficulty encountered in the designing and the building of the reactor, but also the acquisition of a very high concentration of product is facilitated. On the other hand, there is imposed no limitation of the reaction pressure, and the operation may be conducted under the atmospheric pressure or under an elevated pressure. Preferably, the hydrocracking operation is conducted under pressure up to 50 atms.

The catalysts which are applied to the method of the present invention consist of solid nickel catalysts which are so designed as to display the required activity only when placed under the aforesaid reaction conditions. The principal active component consists of nickel which is contained in the catalyst in an amount, as nickel, ranging from 5% to 70% by weight. This nickel is considered to be in the state of being reduced when placed under the aforesaid reaction conditions. The carrier may be made with either a natural or synthetic material consisting of an inorganic oxide such as silica, alumina, magnesia and chromia, and these materials are shaped usually into either a spherical, granular or tablet form of appropriate size. The inclusion of an activity promoting component such as copper, chromium and manganese in an amount of the order of 10% or less by weight at the most relative to nickel, or the inclusion of an alkali metal compound or an alkaline earth metal compound in an amount of 20% or less by weight relative to nickel, is effective. Since a nickel catalyst is poor in its resistivity to sulfur (although catalysts containing the aforesaid activity promoting component has a greater resistivity to sulfur as compared with those single-component nickel catalysts), it will be desirable that the raw feed hydrocarbon be given desulfurizing treatment before it is brought into the hydrocracking operation.

The methane concentration of the gas produced according to the method of the present invention is as high as 98%. It is needless to say that methane of a lower concentration can be acquired also according to the method of the present invention. It is to be noted, however, that the advantages and features of the present invention are such that it does not have as an object the production of gas having a methane concentration of 70% or less. It is only in the production of methane of a high concentration of 80% or more that the method of the present invention can display a marked effect.

The effects and advantages of the method of the present invention will be hereunder enumerated.

(1) The manufacture of a high purity methane by such a hydrocracking process as has never before been carried out with a success industrially is now made possible.

(2) The reaction temperature which is generated during the hydrocracking operation can be controlled as desired by the supply of steam to the reaction zone.

(3) The problem of the deposition of carbonaceous substances which could not have been avoided in the prior art can be controlled easily by the supply of a small amount of steam to the reaction zone.

(4) There is noted hardy any deterioration of the catalytic activity which has been encountered conventionally in operations which were accompanied by the generation of a high temperature accruing from the reaction, and it has now been made possible to conduct continuous operation with stability and economy.

(5) The methane gas produced is never diluted by the hydrogen supply of a super excess amount, and therefore, the actual operation requires no additional provision of the step of separating hydrogen from the gas produced.

(6) The step of removing carbon dioxide which was necessary in the prior method consisting of the combination of the three steps of steam-reforming, methanation and removing of carbon dioxide, is altogether unnecessary.

(7) As compared with the prior method of the combination of the three steps of steam-reforming, methanation and removing of carbon dioxide, the method of the present invention permits the conversion of raw feed hydrocarbons to methane at a remarkable yield.

(8) The hydrocracking operation is conducted at a relatively low temperature, and this makes the selection of the materials of equipment very easy, and moreover, it permits the use of cheap materials for the construction of the equipment.

(9) The present invention permits one to select, with a considerable freedom, the operation system so as to meet the purposes. Also, it permits one to adopt a simplified reaction apparatus of low cost.

(10) The cost of construction of the reaction apparatus is small and also the operation per se is easy to carry out.

DESCRIPTION OF THE PREFERRED EMBODIMENTS

Example 1

Commercial solvent hexane was used as the raw feed hydrocarbon. This hexane (600 gr./hr.) mixed with hydrogen gas (784 Nl./hr.) was fed to the externally cooled multi-tube type reactor which was packed with solid nickel catalyst. The catalyst used was of a tablet shape and consisted of a carrier made of silica on which were deposited 37% by weight of nickel and 4% by weight of oxides of copper, chromium and manganese and also 15% by weight of magnesium oxide. To the raw feed mixture was additionally supplied steam at the rate of 753 gr./hr. The resulting mixture was preheated at 380° C. before it was passed through the catalyst bed. The reaction pressure was controlled to 20 atms. gauge. The temperature of the catalyst bed was elevated up to the maximum of 580° C. due to the hydrocracking reaction. However, this temperature of the catalyst bed did not rise any further above that level as a result of the supply of steam thereto. (The temperature would have risen over 900° C. without the supply of steam.) Owing to the external cooling, the temperature at the outlet of the catalyst bed was lowered to 400° C. The gas thus produced had the following composition:

$CH_4$ ---------- 86.6% by volume (relative to dry gas).
$H_2$ ---------- 10.8% by volume.
$CO$ ---------- Trace.
$CO_2$ ---------- 2.6% by volume.

The gas was yielded at the rate of 1050 Nl./hr. No byproduct was produced, nor was there noted any deposition of carbonaceous substance whatsoever.

Example 2

A catalyst identical to the one used in Example 1 was employed. The operation, however, was carried out under different reaction conditions. The raw feed hydrocarbon consisted of straight run light naphtha which was of the following properties:

Specific gravity 15/4° C. _____ 0.687
ASTM distillation test:
 IBP _____° C__ 34.5
 50% _____° C__ 75.7
 EP _____° C__ 138.0

After having undergone a desulfurizing treatment, this raw feed naphtha (528 gr./hr.) was mixed with a hydrogen-bearing gas of which (70% consisted of hydrogen) which was fed at the rate of 1037 Nl./hr. (the remaining part of this hydrogen-bearing gas consisted almost entirely of methane). To this mixture was supplied steam at the rate of 917 gr./hr. The resulting mixture was fed to the reaction zone at 340° C. The reaction zone consisted of three devisions of catalyst beds. A cooling unit was inserted in each of the intermediate portions of these three stages. The reaction pressure was controlled to 10 atms. gauge. The temperature of the product gas at the outlet of the first catalyst bed was measured to be 530° C. This product was then fed, after being cooled to 300° C., to the second catalyst bed. The temperature of the product gas at the outlet of this second catalyst bed was noted to be 420° C. The product gas was then cooled to ambient temperature to condense and separate the moisture from the gas. Thereafter, the gas was heated to 220° C. before being supplied to the third catalyst bed. The product gas which was finaly discharged from the reaction zone showed a temperature of 350° C. The gas thus produced had the following composition:

$CH_4$ _____ 96.4% by volume relative to dry gas).
$H_2$ _____ 2.9% by volume.
$CO$ _____ Trace.
$CO_2$ _____ 0.7% by volume.

The yield was 1175 Nl./hr.

Example 3

In this example were employed a catalyst and a reaction apparatus which were both identical to those used in Example 2. Experiment was conducted on a raw feed which consisted of desulfurized kerosene which was a fraction from petroleum. This raw feed kerosene had the following properties:

Specific gravity 15/4° C. _____ 0.745
ASTM distillation test:
 IBP _____° C__ 51
 50% _____° C__ 149
 EP _____° C__ 237

The reaction conditions were as follows:

Feed rate:
 Kerosene _____gr./hr__ 550
 Hydrogen gas _____Nl./hr__ 1100
 Steam _____gr./hr__ 1050
Reaction pressure _____ atms. gauge__ 10
Reaction temperatures:
 Inlet of the first catalyst bed _____° C__ 260
 Outlet of the first catalyst bed _____° C__ 550
 Inlet of the second catalyst bed _____° C__ 320
 Outlet of the second catalyst bed _____° C__ 450
 Inlet of the third catalyst bed _____° C__ 260
 Outlet of the third catalyst bed _____° C__ 350

The composition of the gas produced (relative to dry gas) was as follows:

$CH_4$ _____ 77.3% by volume.
$H_2$ _____ 22.7% by volume.
$CO$ _____ Trace.
$CO_2$ _____ Trace.

The yield was 1130 Nl./hr.

In this example, moisture was removed in the intermediate area between the second and the third catalyst beds. In this instant example, hydrogen was supplied in an amount 1.3 times the theoretical amount. In case hydrogen of the theoretical amount was supplied, however, the maximum temperature was noted to be 550° C. and the temperature at the outlet was 400° C. The methane concentration of the gas produced was noted to be 93%.

Example 4

In this example, butane was used as the raw feed. Using this butane, an experimental manufacture of methane having a concentration of 98% was conducted. The catalyst employed consisted of tablet-shaped one which was comprised of 50% by weight of nickel deposited on a carrier which was made with a diatomaceous earth. The reaction apparatus used was similar to the one described in Example 2.

Raw feed butane _____ Commercial butane
Reaction conditions:
 Feed rate:
  Butane _____gr./hr__ 580
  Hydrogen gas _____Nl./hr__ 670
  Steam _____gr./hr__ 900
 Reaction pressure atms. gauge _____ 10
 Reaction temperature:
  Inlet of the first catalyst bed _____° C__ 310
  Outlet of the first catalyst bed _____° C__ 530
  Inlet of the second catalyst bed _____° C__ 210
  Outlet of the second catalyst bed ___° C__ 470
  Inlet of the third catalyst bed _____° C__ 225
  Outlet of the third catalyst bed ____° C__ 320
Composition of the gas produced (relative to dry gas):
 $CH_4$ _____ 97.8% by volume.
 $H_2$ _____ 1.8% by volume.
 $CO$ _____ Trace.
 $CO_2$ _____ 0.4% by volume.
Yield _____Nl./hr__ 910

In this instant example, moisture was removed intermediately of each of the catalyst beds. At the end of the reaction which was conducted continuously for 700 hours, there was noted no deterioration of the activity of the catalyst. No by-product was noted in any one of these examples, nor was there noted a deposition of carbonaceous substance either.

What is claimed is:

1. A method for manufacturing high purity methane from a raw feed consisting of a higher hydrocarbon having two or more carbon atoms, selected from the group consisting of liquified petroleum gas, naphtha, kerosene and light oil, by subjecting said raw feed to hydrocracking, comprising the steps of passing said raw feed, hydrogen gas and steam through a bed of activated solid nickel catalyst, the amount of hydrogen gas supplied being in the range of from 90% to 150% of the amount theoretically required for the production of methane from said raw feed, the amount of steam supplied being sufficient to maintain the maximum temperature of the catalyst bed in the range of 400° C. to 600° C., and simultaneously removing from said catalyst bed by indirect heat exchange, sufficient reaction heat to maintain the temperature at the outlet of said catalyst bed at a level of at least 100° C. lower than said maximum temperature of said catalyst bed.

2. A method according to claim 1, wherein the amount of said steam supplied is in the range of from 0.5 kg. to 3.5 kg. per kg. of said raw feed hydrocarbon.

3. A method according to claim 1, wherein said catalyst is comprised of a carrier made with a material selected from the group consisting of silica, alumina, magnesia and chromia, and also comprised of a principal active component consisting of nickel of an amount ranging from 5% to 70% by weight which is deposited on said carrier.

4. A method according to claim 3, wherein said catalyst further contains an activity promoting component selected from the group consisting of copper oxides, chromium oxides, manganese oxides and their mixtures in an amount 10% or less by weight of said nickel.

5. A method according to claim 3, wherein said activity promoting component is a compound selected from the group consisting of alkali metal compounds and alkaline earth metal compounds, said activity promoting component being contained in an amount 20% or less by weight of said nickel.

References Cited

UNITED STATES PATENTS

| | | | |
|---|---|---|---|
| 3,368,964 | 2/1968 | Ch'in et al. | 208—60 |
| 3,320,182 | 5/1967 | Taylor et al. | 252—466 |
| 3,364,133 | 1/1968 | Young et al. | 208—89 |
| 3,363,024 | 1/1968 | Majumdar et al. | 260—683.9 |
| 3,371,029 | 2/1968 | Weiland | 208—102 |
| 3,421,870 | 1/1969 | Sinfelt | 260—676 |
| 3,058,906 | 10/1962 | Stine et al. | 208—111 |

DELBERT E. GANTZ, Primary Examiner

C. E. SCHMITKONS, Assistant Examiner

U.S. Cl. X.R.

48—213; 208—108, 112; 252—459